US008621819B2

(12) United States Patent
Kayani et al.

(10) Patent No.: US 8,621,819 B2
(45) Date of Patent: Jan. 7, 2014

(54) SHIM FOR ARRANGEMENT AGAINST A STRUCTURAL COMPONENT AND A METHOD OF MAKING A SHIM

(75) Inventors: Amir Kayani, Bristol (GB); Ian L. Gray, Bristol (GB)

(73) Assignee: Airbus Operations Limited, Bristol (GB)

(*) Notice: Subject to any disclaimer, the term of this patent is extended or adjusted under 35 U.S.C. 154(b) by 777 days.

(21) Appl. No.: 12/211,185

(22) Filed: Sep. 16, 2008

(65) Prior Publication Data

US 2009/0100791 A1 Apr. 23, 2009

(30) Foreign Application Priority Data

Oct. 23, 2007 (GB) .................................. 0720702.0

(51) Int. Cl.
*B23Q 17/00* (2006.01)
(52) U.S. Cl.
USPC .................. 52/745.19; 29/407.01; 29/407.05; 29/407.09
(58) Field of Classification Search
USPC .............. 52/745.19, 745.2; 269/37; 29/281.1, 29/407.01, 407.05, 407.09
See application file for complete search history.

(56) References Cited

U.S. PATENT DOCUMENTS

| 5,385,050 | A | 1/1995 | Roberts |
| 5,815,992 | A | 10/1998 | Wells et al. |
| 6,230,446 | B1 | 5/2001 | Chalich |
| 6,618,505 | B2 * | 9/2003 | Cork et al. ..................... 382/190 |
| 6,907,651 | B1 * | 6/2005 | Fisher et al. ............... 29/407.05 |
| 7,208,057 | B2 * | 4/2007 | Weisser .......................... 156/64 |
| 7,279,056 | B2 * | 10/2007 | Weisser .......................... 156/64 |
| 7,730,789 | B2 * | 6/2010 | Odendahl ....................... 73/780 |
| 2006/0048465 | A1 * | 3/2006 | Tremblay ........................ 52/177 |
| 2006/0162859 | A1 * | 7/2006 | Pridie ........................... 156/285 |
| 2008/0205763 | A1 * | 8/2008 | Marsh et al. .................. 382/190 |

FOREIGN PATENT DOCUMENTS

WO 99/62422 A1 12/1999

OTHER PUBLICATIONS

UK Search Report for GB0720702.0 dated Feb. 20, 2008.

* cited by examiner

*Primary Examiner* — William Gilbert
*Assistant Examiner* — Alp Akbasli
(74) *Attorney, Agent, or Firm* — Lowe Hauptman & Ham, LLP

(57) ABSTRACT

A method of making a shim comprises the steps of providing a first structural component, such as a rib foot of an aircraft wing. The rib foot is then scanned or mapped to generate the surface profile of the rib foot. The shim is then formed to include a feature on its surface which complements the surface profile of the assembly surface.

5 Claims, 7 Drawing Sheets

SHIM FOR ARRANGEMENT AGAINST A STRUCTURAL COMPONENT AND A METHOD OF MAKING A SHIM

RELATED APPLICATIONS

The present application is based on, and claims priority from, British Application Number 0720702.0, filed Oct. 23, 2007, the disclosure of which is hereby incorporated by reference herein in its entirety.

FIELD OF THE INVENTION

The present invention relates to the assembly together of structural components and particularly where those structural components require shimming to take up small clearance fits.

BACKGROUND OF THE INVENTION

Manufactured components are generally produced to a size with small variations within an acceptable tolerance limit. When fabricating such individual components together into a multi-part structural assembly, such as an aircraft wing, small clashes between the components (interference fits) or gaps (clearance fits) can occur. In the case of an interference fit, material has to be removed from one or both of the components whilst retaining sufficient structural integrity. For clearance fits, several options are available for filling the gap depending upon its magnitude. For small gaps a liquid spacer which hardens can be used. However, for gaps which are greater than the limits allowed for liquid shimming, it is necessary to insert a hard packer. If the packer merely fills the gap between the components and there is no fixing to either component then there is a limit to the thickness of the gap that can be filled before the presence of the thick packer begins to compromise the structural integrity of the joint. Fatigue cycling and material creep in service can compromise the integrity of the joint.

One shim is known from U.S. Pat. No. 5,815,992 which comprises two parts and which is adjustable in height.

Another shim is shown in U.S. Pat. No. 6,230,446. That shim comprises a wedge shaped shim which is pre-scored to enable easy breaking off and which has a series of recesses on the underside thereof to resist sliding.

Neither arrangement determines the surface profile of the structural element or elements against which the shim is to be located.

SUMMARY OF THE INVENTION

A first aspect of the invention provides a method of making a shim for arrangement against a structural component comprising the steps of:

providing a first structural component having an assembly surface against which a shim is intended to be arranged, mapping the assembly surface of the first structural component, forming a shim having a shim surface which is provided with a feature which is shaped to conform with at least part of the mapped assembly surface.

In that way, by mapping the assembly surface and creating a shim having a shim surface with complementary features preserves the shear capability of the shim when arranged between the structural components and maintains the structural integrity of the joint between the components and the shim.

A second aspect of the invention provides a structural sub-assembly comprising a structural component having an assembly surface provided with a formation and a shim having a shim surface provided with a shim feature shaped to conform with the formation, the shim being arranged against the structural component so that the assembly surface and the shim surface are in contact with each other and a shim feature conforms with the formation.

A third aspect of the invention provides a shim for arrangement against a structural component, the shim having a shim surface which is provided with a first feature defining opposite ends spaced apart by first distance and a second feature spaced from the first feature defining opposite ends spaced apart by a second, different distance.

Further preferred features of the method, the sub-assembly and the shim are set out in the claims appended hereto.

BRIEF DESCRIPTION OF THE DRAWINGS

Embodiments of the invention will now be described with reference to the accompanying drawings, in which:

In FIG. 1, a rib foot 10 of a rib for an aircraft wing assembly is shown. The rib foot 10 comprises a rectangular foot plate 12 mounted on a leg 14. The foot plate 12 has an assembly face 16 which, in use, is assembled against another structural component. The assembly face 16 has a series of recesses 18 formed therein which may be circular or any other appropriate shape. In the embodiment shown, the recesses are circular. Each of the recesses has a diameter D1 to D4 which may be the same as each other or may differ. In the FIG. 1 embodiment the recesses are deliberately formed during manufacturing of the rib foot 10.

Figure 1:
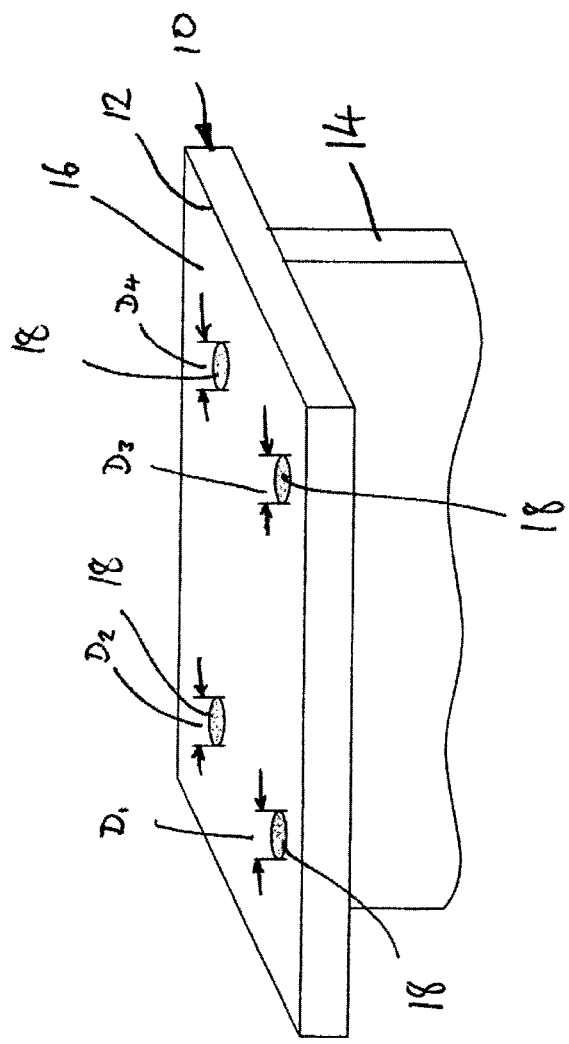
FIG. 1 is a schematic perspective view of a rib foot for an aircraft wing structure.

The assembly surface 16 of the rib foot is scanned or mapped using a known scanning arrangement, for example a laser scanner typically used to reverse engineering applications. The position and size of the recesses 18 are determined and a shim 20 is formed. The shim 20 has a shim assembly surface 22 on which are formed a series of projections 24. The projections 24 are shaped, sized and positioned on the shim so as to correspond with the recesses 18 on the rib foot 10. Consequently, the projection 24 which corresponds with the recess 18 having a diameter D1 has a diameter $D1^1$, $D1^1$ being a clearance fit for the diameter D1.

Thus, by scanning the surface of the rib foot 10 against which the shim 20 is intended to be located and forming the shim with formations that are complementary to the formations on the rib foot, when the shim is located against the rib foot a positive mechanical engagement occurs between the shim and the rib foot so as to provide the shim to rib foot interface with improved shear characteristics.

Alternatively or in addition to the projections 24, the shim 20 may be provided with a peripheral lipped part 26 which is arranged to have a tight clearance fit around the edge of the assembly surface 16 of the rib foot 10. Again, the peripheral lipped part 26 of the shim 20 is formed as a result of mapping of the assembly surface 16 of the rib foot 10 and forming the lipped part 26 so as to complement that mapped surface.

Figure 4:
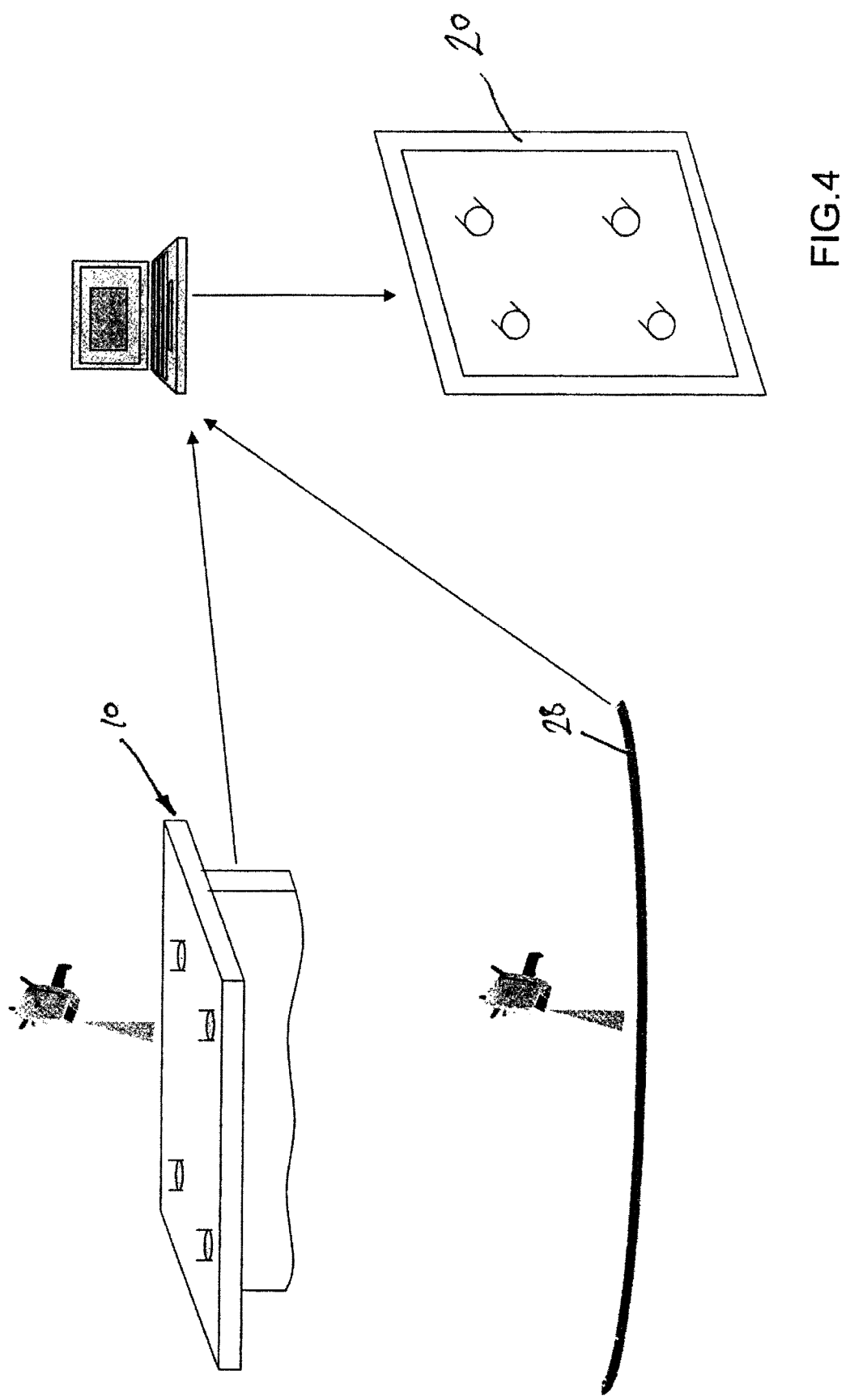
FIG. 4 is a flow chart showing the method of the present invention.

In FIG. 4, the method according to the invention is illustrated. Firstly, the rib foot 10 and more particularly the assembly surface 16 of the rib foot 10 is scanned using appropriate scanning equipment. Alternatively, or additionally, a surface of another structural component 28 against which the rib foot 10 is to be secured is also scanned. Generally, in aircraft wing design, the rib feet are secured to the inner surface of the aircraft wing skin. Whilst the outer surface of the aircraft wing skin is tightly dimensionally controlled, the inner wing skin is not so controlled and substantial variations in surface profile can exist.

The scanned surface profile data of the rib foot 10 and, optionally, the assembly surface of the other structural component 28 are processed in a CPU to enable a shim 20 to be manufactured with the features complementary to one or both surfaces. The shim 20 can then be interposed between the rib foot 10 and the further component 28. As stated above, in aircraft manufacture, the other component 28 is an aircraft wing skin.

Figure 5:
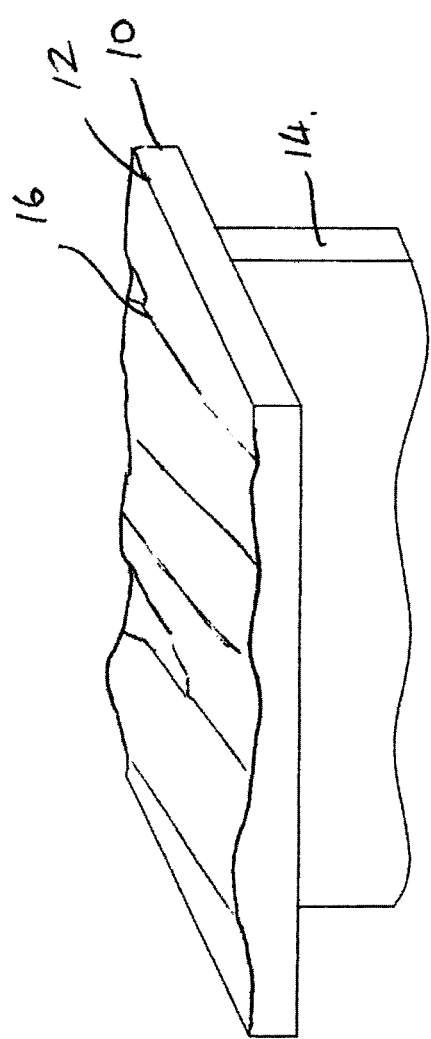
FIG. 5 is a schematic perspective view of a further rib foot for an aircraft wind structure.

Turning to FIG. 5, a further rib foot 10 is shown and parts corresponding to parts in FIG. 1 carry the same reference numerals. In FIG. 5, the assembly surface 16 of the rib foot 10 has not been finished by machine and does not include the deliberately formed recesses 18. Instead, the surface profile of the assembly 16 is the profile obtained when machined initially from billets.

Figure 2:
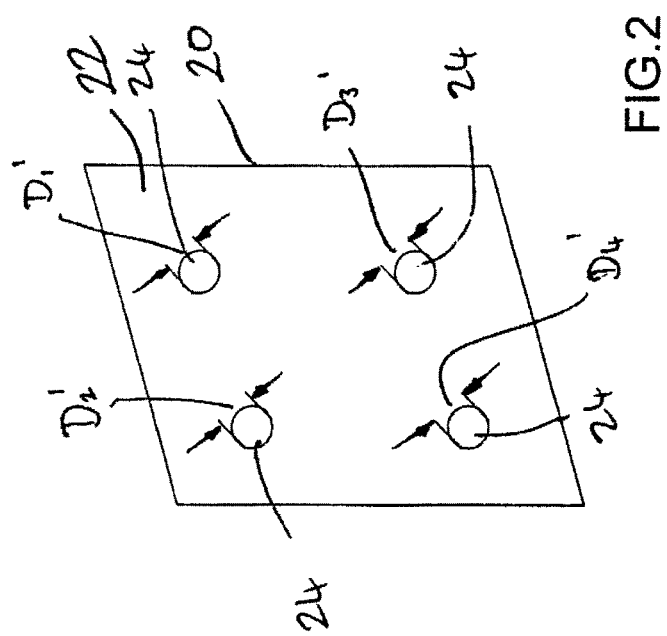
FIG. 2 is a schematic perspective view of a shim for use with the rib foot of FIG. 1.
Figure 3:
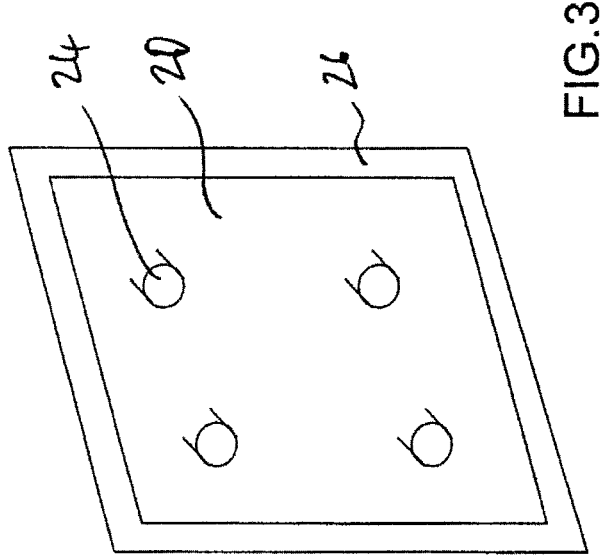
FIG. 3 is a schematic perspective view of an alternative shim for use with the rib foot of FIG. 1.
Figure 6:
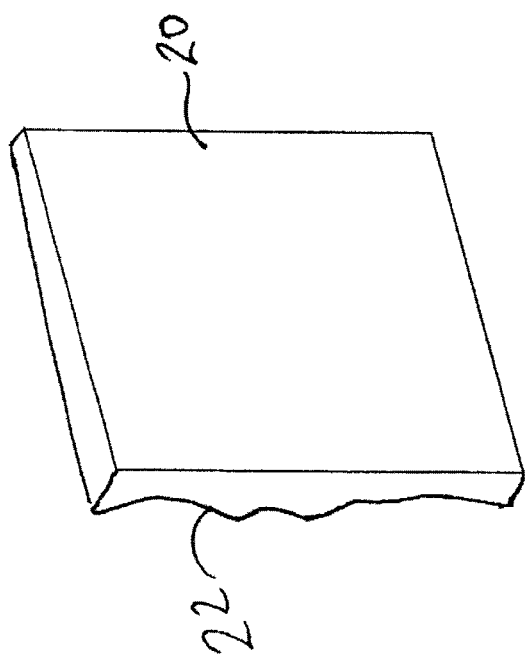
FIG. 6 is a schematic perspective view of a shim for use with the rib foot of FIG. 5.

In the present invention, the surface profile 16 is scanned by appropriate scanning equipment as mentioned above and the surface profile data generated by the scanner is passed to a CPU which facilitates the manufacture of a shim, as shown in FIG. 6. A shim 20 in FIG. 6 is substantially similar to that shown in FIG. 2 and parts corresponding to parts in FIG. 2 carry the same reference numerals. The shim 20 has a shim assembly surface 22 which is provided with formations 30 intended to complement the formations on the surface profile of the assembly surface 16 of the rib foot 10. Consequently, this arrangement differs from the FIG. 1 arrangement in that the natural imperfections in the surface of the rib foot are used to create the shim and thus to create a positive engagement between the assembly surface 16 of the rib foot 10 and the shim assembly surface 22.

Figure 7:
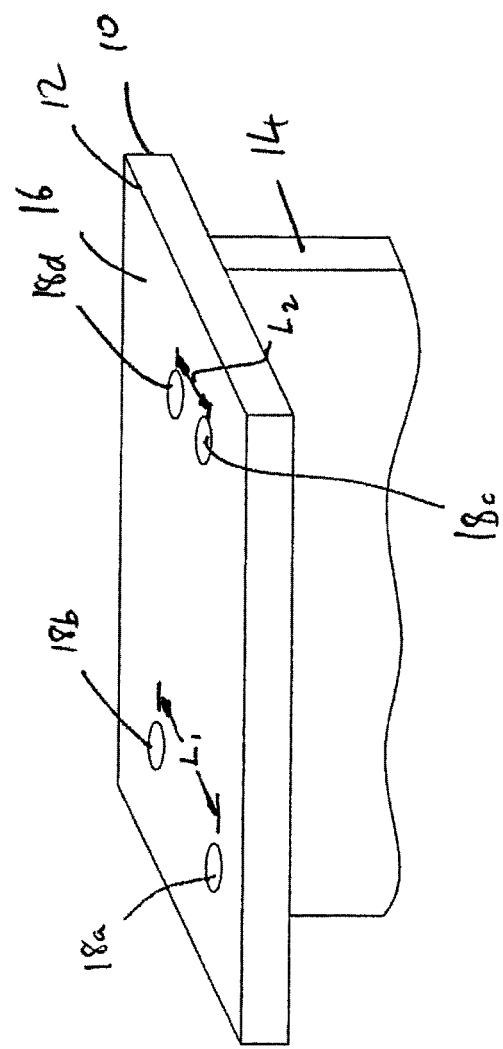
FIG. 7 is a schematic perspective view of another rib foot.

In FIG. 7, a rib foot 10 similar to that shown in FIG. 1 is shown. Parts corresponding to parts in FIG. 1 carry the same reference numbers. It will be noted that in FIG. 7 the recesses 18 are in two spaced pairs. The first pair 18*a*, 18*b* have their centreline spaced apart by a distance L1 whereas the recesses 18*c*, 18*d* have a centreline spaced apart by a smaller distance L2. By providing an asymmetrical arrangement of recesses 18*a, b, c, d*, the corresponding shim which is made according to the mapped assembly surface 16 of the rib foot 10 is provided with a specific orientation relative to the rib foot 10. The orientation is guaranteed by the asymmetric arrangement of recesses and corresponding projections. Other mechanisms for providing an orientation might include predetermined shapes of recess and projection and/or predetermined varying sizes, as well as the spacing arrangement envisaged above. Other mechanisms for ensuring orientation of the shim relative to the rib foot 10 are within the ambit of the skilled person.

The shim is manufactured using material sintering technology to produce the shim in a structural material such as aluminium, titanium or another suitable structural material, whether metallic or non-metallic. The process is advantageous because the shim is tailor-made for the joint which it is arranged to fill and is designed to complement the surface against which it will lie during service life. Because the surface of the rib foot has been scanned using an appropriate scanning technology and the profile has been used to form a 3-dimensional image of the rib foot, the present technique can be coupled with rapid prototyping to test the fit of the shim prior to manufacturing the final product if such a step is deemed necessary.

By creating complementary features on the interface surfaces of the shim and the structural component, the shear capability of the joint is improved even in the event of a joint relaxation during service.

Although the invention has been described above with reference to one or more of the preferred embodiments, it will be appreciated that various changes or modifications may be made without departing from the scope of the invention as defined in the appended claims.

The invention claimed is:

1. A method of making a shim for arrangement against a structural component comprising the steps of:
   providing a first structural component having an assembly surface against which a shim is intended to be arranged,
   mapping the assembly surface of the first structural component by scanning the surface profile,
   forming a map using the scanned surface profile data of the first structural component,
   using the map of the assembly surface to design a shim having a shim surface which is provided with a feature which is shaped to conform with at least part of the assembly surface separately from the first structural component, and
   making the shim separately from the structural component.

2. A method of making a shim accordingly to claim 1 in which the method further comprises the step of providing a second structural component having a second assembly surface against which the shim is intended to be arranged, the second assembly surface having a second formation, the step of designing a shim comprises forming the shim with the first shim surface having a feature shaped to conform with at least part of the mapped first assembly surface and a second shim surface provided with a feature which is shaped to conform with at least part of the mapped second assembly surface.

3. A method of making a shim according to claim 1 in which the step of providing each structural component comprises first and/or second assembly surfaces with a predetermined formation with which the feature on the shim surface conforms.

4. A method of making a shim according to claim 3 in which each formation is asymmetrical and the feature on the shim is asymmetrical to ensure the orientation of the shim when arranged against the assembly surface.

5. A method of making a shim according to claim 3 in which the step of providing a first structural component comprises providing a rib for an aircraft wing and the step of providing the second structural component comprises providing the skin of an aircraft wing.

* * * * *